United States Patent
Hayashizaki et al.

(10) Patent No.: US 10,259,328 B2
(45) Date of Patent: Apr. 16, 2019

(54) POWER-TRANSFER CONTROL DEVICE FOR VEHICLE INCLUDING POWER STORAGE DEVICE AND COMMUNICATION UNIT

(71) Applicant: TOYOTA JIDOSHA KABUSHIKI KAISHA, Toyota-shi, Aichi-ken (JP)

(72) Inventors: Kengo Hayashizaki, Okazaki (JP); Nobuyuki Nakagawa, Miyoshi (JP); Ryo Tanaka, Kyotanabe (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 302 days.

(21) Appl. No.: 15/115,467

(22) PCT Filed: Jan. 7, 2015

(86) PCT No.: PCT/JP2015/050258
§ 371 (c)(1),
(2) Date: Jul. 29, 2016

(87) PCT Pub. No.: WO2015/122214
PCT Pub. Date: Aug. 20, 2015

(65) Prior Publication Data
US 2017/0182893 A1    Jun. 29, 2017

(30) Foreign Application Priority Data

Feb. 12, 2014 (JP) ................................. 2014-024372

(51) Int. Cl.
*H02J 7/00* (2006.01)
*B60L 11/18* (2006.01)
*B60L 3/00* (2019.01)

(52) U.S. Cl.
CPC ................ *B60L 11/18* (2013.01); *B60L 3/00* (2013.01); *B60L 11/1816* (2013.01);
(Continued)

(58) Field of Classification Search
CPC .. B60L 11/18; B60L 11/1816; B60L 11/1825; B60L 11/1838; B60L 11/1861;
(Continued)

(56) References Cited

U.S. PATENT DOCUMENTS

2009/0243545 A1* 10/2009 Iwamura ................. H01M 2/34
320/134
2011/0193532 A1*  8/2011 Iwanaga ................ B60K 6/445
320/163

(Continued)

FOREIGN PATENT DOCUMENTS

EP          2 189 948 A2    5/2010
JP          2003-333706 A  11/2003
(Continued)

*Primary Examiner* — Nathaniel R Pelton
(74) *Attorney, Agent, or Firm* — Finnegan, Henderson, Farabow, Garrett & Dunner, LLP

(57) ABSTRACT

When connection of a charging gun is detected, a charging-control ECU wakes up, and turns on a power supply relay to activate a charging-communication ECU. The charging-control ECU subsequently actives a power-control computer by communicating therewith. The power-control computer closes an SMR, and closes a power supply switch to activate a monitoring unit. If an abnormality occurs in inband communication, the charging-control ECU opens the power supply relay, instructs the power-control computer to shift into sleep mode, and subsequently shifts itself into sleep mode. The power-control computer opens the SMR and the power supply switch, and subsequently shifts into sleep mode.

11 Claims, 5 Drawing Sheets

(52) U.S. Cl.
CPC ....... *B60L 11/1825* (2013.01); *B60L 11/1838* (2013.01); *B60L 11/1861* (2013.01); *H02J 7/00* (2013.01); *B60L 11/1846* (2013.01); *B60L 2230/10* (2013.01); *B60L 2250/10* (2013.01); *B60L 2260/52* (2013.01); *Y02T 10/7005* (2013.01); *Y02T 10/705* (2013.01); *Y02T 10/7044* (2013.01); *Y02T 10/7088* (2013.01); *Y02T 10/92* (2013.01); *Y02T 90/121* (2013.01); *Y02T 90/128* (2013.01); *Y02T 90/14* (2013.01); *Y02T 90/16* (2013.01); *Y02T 90/163* (2013.01)

(58) Field of Classification Search
CPC .............. B60L 11/1846; B60L 2230/10; B60L 2250/10; B60L 2260/52; H02J 7/00
USPC ........................................................ 320/137
See application file for complete search history.

(56) References Cited

U.S. PATENT DOCUMENTS

| | | |
|---|---|---|
| 2012/0274276 A1 | 11/2012 | Endo |
| 2014/0232355 A1 | 8/2014 | Masuda et al. |
| 2014/0292069 A1 | 10/2014 | Hagihara et al. |
| 2015/0023438 A1 | 1/2015 | Takata et al. |
| 2015/0120129 A1* | 4/2015 | Lee ..................... B60R 16/0231 701/29.1 |
| 2015/0380951 A1* | 12/2015 | Okamoto ................ H02J 50/80 307/104 |

FOREIGN PATENT DOCUMENTS

| | | |
|---|---|---|
| JP | 2004-153967 | 5/2004 |
| JP | 2006-74868 | 3/2006 |
| JP | 2011-120346 A | 6/2011 |
| JP | 2012-70623 | 4/2012 |
| JP | 2012-139089 | 7/2012 |
| JP | 2012139089 * | 7/2012 |
| JP | 2012-147549 | 8/2012 |
| JP | 2012-231650 | 11/2012 |
| WO | WO2013-008921 A1 | 1/2013 |
| WO | WO2013/054387 A1 | 4/2013 |
| WO | WO 2013/129038 A1 | 9/2013 |

* cited by examiner

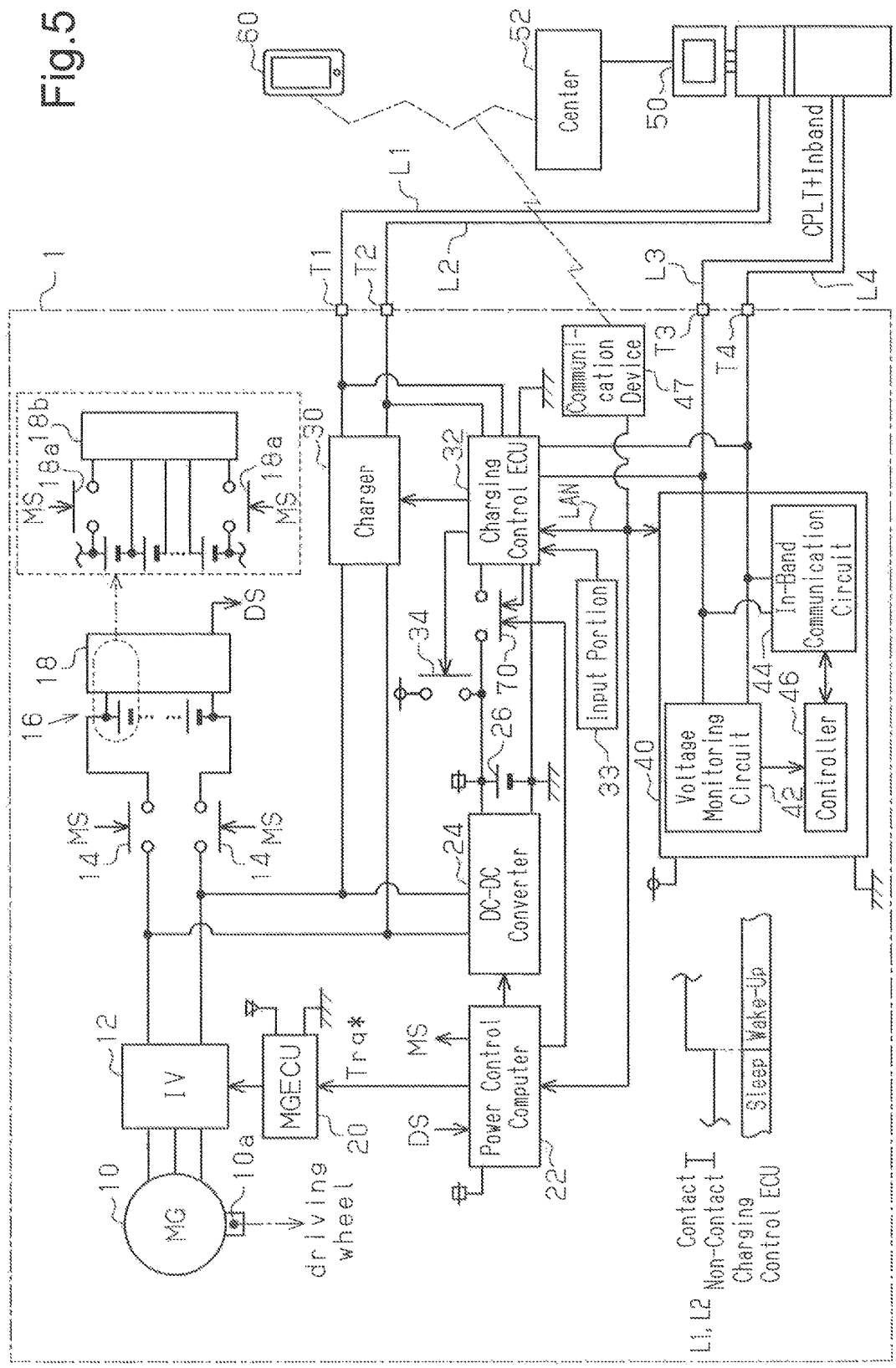

US 10,259,328 B2

POWER-TRANSFER CONTROL DEVICE FOR VEHICLE INCLUDING POWER STORAGE DEVICE AND COMMUNICATION UNIT

CROSS-REFERENCE TO RELATED APPLICATIONS

This application is a national phase application of International Application No. PCT/JP2015/050258, filed Jan. 17, 2015, and claims the priority of Japanese Application No. 2014-024372, filed Feb. 12, 2014, the content of both of which is incorporated herein by reference.

TECHNICAL FIELD

The present invention relates to a power transfer control device.

BACKGROUND ART

Patent document 1 discloses a power transfer control device that is applied to a vehicle including an in-vehicle power storage device, which transfers power to and from an external power source, and a communication unit for transferring power. When an antitheft device installed in a plug-in vehicle detects an abnormality, the power transfer control device interrupts the charging of an in-vehicle battery from the external power source and instructs an ECU that controls the car air conditioner to perform maximum output operation. This increases the discharging of the in-vehicle battery.

When charging the in-vehicle battery from the external power source, there is a technique that uses a communication line, in addition to a charge cable, to connect the vehicle and the external power source and transfer a control pilot signal (CPLT signal) that controls charging.

Patent document 2 describes performing in-band communication that exchanges more information than information included in the CPLT signal by superimposing a high frequency signal, which has a higher frequency than the CPLT signal, on the CPLT signal.

A standard for in-band communication regulates that communication is to be interrupted in at least one of a vehicle side and an external power source side when a communication abnormality occurs. If a power transfer control device such as that described in patent document 1 increases discharging of the in-vehicle battery when a communication abnormality occurs, the following problems occur. When charging is desired and a communication abnormality occurs, the charging rate of the in-vehicle battery may be excessively decreased. In addition to a device that performs in-band communication, a device that transfers power while communicating with an external power source may consume storage charge of the in-vehicle battery in an unnecessary manner when a communication abnormality occurs.

PRIOR ART DOCUMENTS

Patent Documents

Patent Document 1: Japanese Laid-Open Patent Publication No. 2012-231650
Patent Document 2: International Publication No. WO2013/129038

SUMMARY OF THE INVENTION

Problems that are to be Solved by the Invention

It is an object of the present invention to provide an in-vehicle power transfer device that limits unnecessary consumption of power of an in-vehicle power storage device when an abnormality occurs in communication with an external power source.

Means for Solving the Problem

To achieve the above object, a first aspect of the present invention provides a power transfer control device applied to a vehicle including an in-vehicle power storage device that transfers power to and from an external power source and a communication unit that performs communication to transfer the power. The power transfer control device includes a transfer control unit that executes control for transferring the power and a reduction processing unit that reduces a power consumption amount of the transfer control unit to be lower than a power consumption amount of when the transfer control unit executes control for transferring the power under a condition in which an abnormality occurs in the communication.

The above device executes a process for reducing the power consumption amount of the transfer control unit under a condition in which an abnormality occurs in communication. Thus, when an abnormality has occurred in communication, the transfer control unit may be inhibited from consuming power in an unnecessary manner when the power is not transferred.

Preferably, in the power transfer control device, under a condition in which an abnormality occurs in the communication when transferring the power, the reduction processing unit reduces a power consumption amount of the transfer control unit to be lower than a power consumption amount of when the transfer control unit executes control for transferring the power.

Preferably, the power transfer control device further includes a determination unit that determines, after an abnormality occurs in the communication, whether or not to execute a process for reducing the power consumption amount with the reduction processing unit when receiving a value of a parameter related to a stored power amount of the in-vehicle power storage device.

When the power transfer control unit attempts to transfer power, the power consumption amount of the power transfer control unit is increased as compared to when the reduction processing unit executes a process. Thus, the amount of the storage charge of the in-vehicle power storage device that is consumed by the power transfer control unit is increased as compared to when the reduction processing unit executes a process. From the viewpoint of reliability, a lower limit value of the stored power amount is set in the in-vehicle power storage device. Further, the lower limit value of the stored power amount may be set based on a minimum travel distance that is desired by the user. Thus, when attempting to transfer power, whether or not execution of the process of the reduction processing unit is appropriate depends on the stored power amount. In this regard, the above device uses a value of a parameter related to the stored power amount. This appropriately determines whether or not the process for reducing the power consumption amount of the transfer control unit will be executed.

Preferably, the above power transfer control device further includes an obtaining unit that obtains information related to a minimum travel distance that is desired by a user. When the communication is communication performed when the in-vehicle power storage device is charged from the external power source, the reduction processing unit executes the process for reducing the power consumption amount. Under a condition in which the stored power amount is less than or equal to an amount corresponding to the minimum travel distance, the determination unit determines to execute the process for reducing the power consumption amount with the reduction processing unit.

If the reduction processing unit does not execute the process for reducing the power consumption amount when the minimum travel distance desired by the user is not satisfied, the stored power amount of the in-vehicle power storage device is further decreased. This may result in the actual travelable distance being shorter than the minimum travel distance. In this regard, the above device executes the process for reducing the power consumption amount under a condition in which the stored power amount is less than or equal to an amount corresponding to the minimum travel distance. Thus, the transfer control unit may be inhibited from consuming the storage charge of the in-vehicle power storage device. This limits the actual travelable distance from being less than the minimum travel distance.

Preferably, in the above power transfer control device, when the communication is communication performed when the in-vehicle power storage device is charged from the external power source, the reduction processing unit executes the process for reducing the power consumption amount. Under a condition in which the stored power amount is greater than a specified amount that is specified based on a lower limit stored power amount of the in-vehicle power storage device, the determination unit determines to retry a communication process for charging the in-vehicle power storage device from the external power source without executing the process for reducing a power consumption amount with the reduction processing unit.

The above device retries a communication process under a condition in which the stored power amount is greater than or equal to a predetermined amount determined based on the lower limit power storage amount of the in-vehicle power storage device. This limits the stored power amount from being less than the lower limit value even when communication is not established in spite of the retrying of the communication process and the stored power amount of the in-vehicle power storage device is decreased due to not being charged.

Preferably, the above power transfer control device further includes an obtaining unit that obtains information related to a travel distance that is desired by a user. When the communication is communication performed when the in-vehicle power storage device is charged from the external power source, the reduction processing unit executes the process for reducing the power consumption amount. Under a condition in which the stored power amount is less than a stored power amount corresponding to the travel distance that is desired by the user, the determination unit determines to retry a communication process for charging the in-vehicle power storage device from the external power source without executing the process for reducing the power consumption amount with the reduction processing unit.

The above device retries the communication process under a condition in which the logical AND of the stored power amount being greater than or equal to the predetermined amount determined by the lower limit stored power amount of the in-vehicle power storage device and the stored power amount being less than the travel distance desired by the user is true. Thus, charging is more likely to be performed until the stored power amount reaches the amount corresponding to the travel distance desired by the user while avoiding a situation in which the stored power amount becomes less than the lower limit value.

Preferably, in the above power transfer control device, the determination unit determines, after an abnormality occurs in the communication, to execute the process for reducing the power consumption amount with the reduction processing unit under a condition in which a period during which a communication process is retried is greater than or equal to a predetermined value.

When the retrying period is long, it is understood that the storage charge of the in-vehicle power storage device is consumed in an unnecessary manner and that the probability that normal communication is recovered by the retrying is low. In this regard, in the above device, the reduction processing unit executes the process for reducing the power consumption amount under a condition in which the retrying period is greater than or equal to the predetermined value. This limits the unnecessary consumption of the storage charge.

Preferably, the above power transfer control device further includes an obtaining unit that obtains information related to a retrying period that is desired by a user. The determination unit sets the predetermined value to the retrying period, which is obtained by the obtaining unit.

In the above device, the retrying period, which defines a condition for executing the reducing process, is set in accordance with desire of the user.

Preferably, the above power transfer control device further includes a notification processing unit that notifies a user of an abnormality of the communication and information related to a stored power amount of the in-vehicle power storage device when an abnormality occurs in the communication.

The above device notifies the user of communication abnormality and information related to the stored power amount of the in-vehicle power storage device. This allows the user to know that an abnormality has occurred in the communication and the state related to the travelable distance.

Preferably, the above power transfer control device further includes a reception unit that receives an instruction of the user in response to notification of the notification processing unit. The determination unit determines whether or not to execute a reduction process with the reduction processing unit in accordance with reception of the reception unit.

When the user knows the abnormality, the above device allows the user to cope by changing the desire related to the process for transferring power.

Preferably, in the above power transfer control device, communication with the external power source is bidirectional communication. When an abnormality occurs in the communication, the communication is interrupted by at least one of a side of the external power source and a side of the communication unit.

The above device terminates the communication when an abnormality occurs in the communication. Thus, communication needs to be retried to perform communication. However, when an abnormality occurs in communication and communication is retried, the storage charge of the in-vehicle power storage device is consumed in an unnecessary manner. Thus, the reduction processing unit of the above device is particularly advantageous.

Preferably, in the above power transfer control device, the transfer control unit executes a process for monitoring whether or not a power transmission line has been connected to a power transfer port, which is a vehicle-side interface that transfers power to and from the external power source. A power consumption amount in a mode in which the monitoring process is executed is less than a power consumption amount in a mode in which control for transferring the power is executed. When connection of the power transmission line is detected, the transfer control unit is switched to the mode in which control for transferring the power is executed. A reducing process executed by the reduction processing unit includes a process for switching to the mode in which the process for monitoring is executed.

In the above device, the transfer control unit monitors connection of the power transmission line, and the power consumption amount in the mode for monitoring the connection of the power transmission line is less than the power consumption amount in the mode for executing the control for transferring power. Thus, when the control for transferring power is not executed, whether or not the power transmission line has been connected to the power transfer port may be monitored while reducing the power consumption amount.

Preferably, in the above power transfer control device, the reduction processing unit interrupts power supply of the transfer control unit to reduce the power consumption amount of the transfer control unit to lower than the power consumption amount when the transfer control unit executes control for transferring the power.

The above device interrupts the power supply of the transfer control unit. This further reduces the power consumption amount as compared to the sleep mode, in which the power consumption amount is reduced without interrupting the power supply.

Preferably, in the above power transfer control device, the reduction processing unit reduces a power consumption amount of the communication unit in addition to the power consumption amount of the transfer control unit.

In the above device, the power consumption amount of the communication unit is reduced by the reduction processing unit. This further reduces the power consumption amount.

BRIEF DESCRIPTION OF THE DRAWINGS

FIG. 5 is a block diagram showing the entire structure of a third embodiment of a system according to the present invention.

EMBODIMENTS OF THE INVENTION

First Embodiment

A first embodiment of a power transfer control device according to the present invention will now be described with reference to FIGS. 1 to 3.

Figure 1:
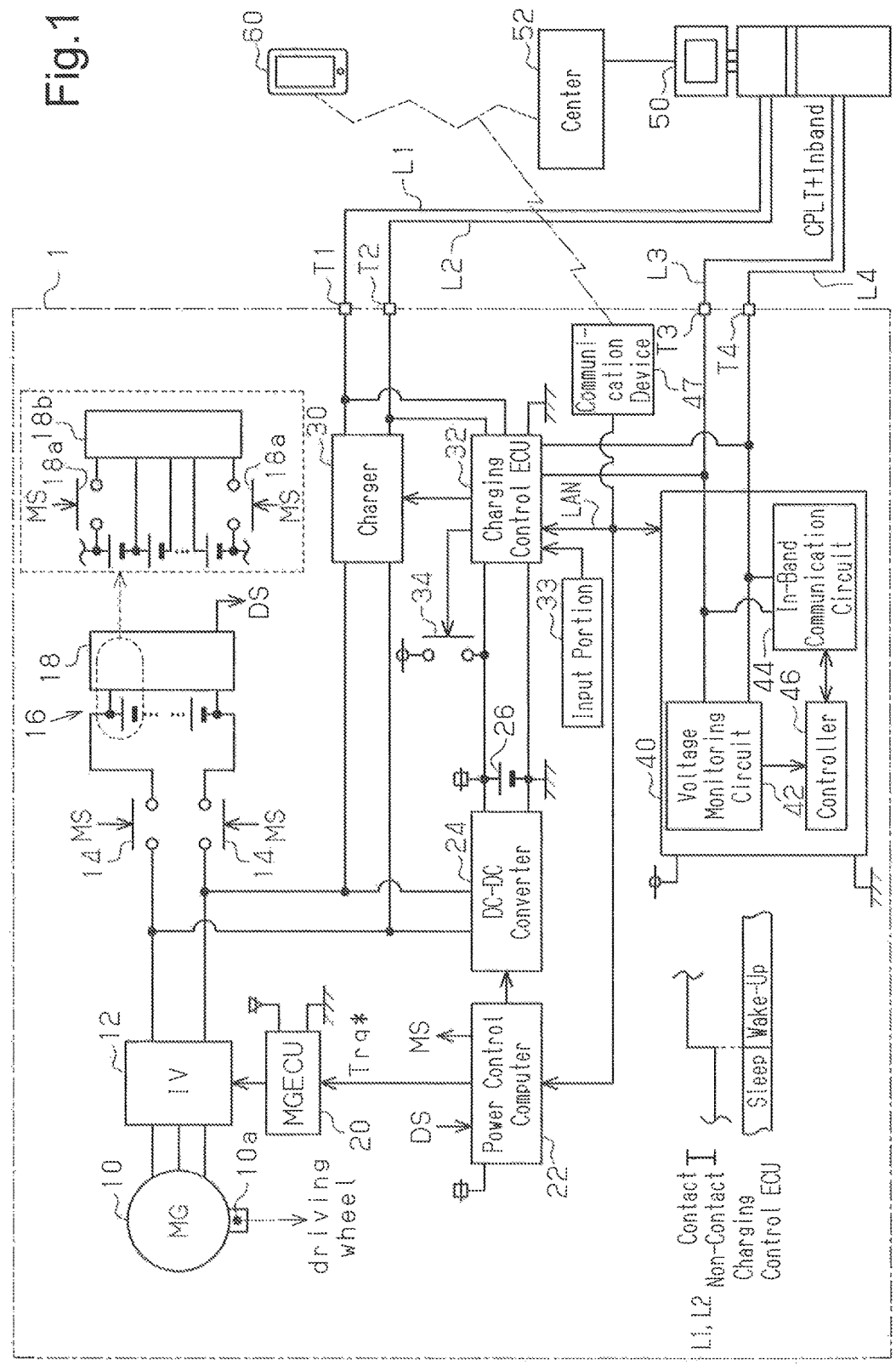
FIG. 1 is a block diagram showing the entire structure of a first embodiment of a system according to the present invention.

As shown in FIG. 1, a vehicle 1, which is an electric vehicle, includes a motor generator 10 that functions as a motor generating driving force of the vehicle 1. The motor generator 10 includes a rotation shaft 10a, which is mechanically coupled to a driving wheel. The motor generator 10 is connected to an inverter 12, which is a DC-to-AC conversion circuit. The inverter 12 includes two input terminals connected to a high voltage battery 16, which is a rechargeable battery, by a system main relay 14 (SMR). The high voltage battery 16 is an assembled battery in which battery cells are connected in series. The high voltage battery 16 is connected to a battery monitor 18, which includes an integrated circuit that monitors the state of the battery cells. The battery monitor 18 includes a monitoring unit 18b that monitors the state of the battery cells in blocks, each of which is defined by adjacent ones of the battery cells in the assembled battery. The monitoring unit 18b is connected to the positive electrode and the negative electrode of each battery cell in the block. The monitoring unit 18b is connected to the positive electrode and the negative electrode of the block by a power switch 18a. The block that is a monitoring subject serves as the power supply of the monitoring unit 18b. The power supply is activated and deactivated by the power switch 18a. When the power switch 18a is closed, the power supply of the monitoring unit 18b is activated.

The inverter 12 controls the motor generator 10. The inverter 12 is operated by an electronic control unit 20 (MGECU). The MGECU 20 operates the inverter 12 in accordance with a torque instruction value Trq* received from a power control computer 22 so that the torque of the motor generator 10 conforms to the torque instruction value Trq*.

The power control computer 22 is an electronic control unit that controls various devices mounted on the vehicle. The power control computer 22 opens and closes the SMR 14 by outputting an operation signal MS to the SMR 14. The power control computer 22 opens and closes the power switch 18a by outputting an operation signal MS to the power switch 18a. When the power supply of the monitoring unit 18b is activated, the power control computer 22 receives a monitoring result signal DS from the monitoring unit 18b and obtains the monitoring result of the battery cells.

The high voltage battery 16 is connected to a DC-DC converter 24 by the SMR 14. The DC-DC converter 24, which is a power conversion circuit, decreases terminal voltage of the high voltage battery 16 and applies the voltage to an accessory battery 26. This charges the accessory battery 26 with the storage charge of the high voltage battery 16. The full charge amount of the accessory battery 26 is less than the full charge amount of the high voltage battery 16. The accessory battery 26 is the power supply of an in-vehicle accessory. In FIG. 1, the power supply using the accessory battery 26 is indicated by symbols of a circle, a square, and an inverted triangle. The symbols of a circle, a square, and an inverted triangle indicate that connection lines to the accessory battery 26 are different. The DC-DC converter 24 is driven in accordance with an instruction of the power control computer 22.

The high voltage battery 16 is connected to a charger 30 by the SMR 14. The charger 30 is a power conversion circuit that charges the high voltage battery 16 from an external power source 50 through terminals T1, T2 of the vehicle.

A charging control ECU 32 is an electronic control unit that operates the charger 30. The charging control ECU 32 controls the charging of the high voltage battery 16 from the external power source 50 based on a request of the user received from an input portion 33 or the like. When a charging gun is connected to the terminals T1, T2, the charging control ECU 32 monitors whether or not the charging gun is connected to charging lines L1, L2. As shown in the lower left section of FIG. 1, when the charging gun is connected to the terminals T1, T2, a sleep mode in which the power consumption amount is small is switched to a wake-up mode in which the power consumption amount is large. This is because the power consumption amount needed to operate the charger 30 is greater than the power consumption amount needed to monitor the connection of the charging lines L1, L2.

The process for charging from the external power source 50 is executed when the charging lines L1, L2 are connected to the terminals T1, T2, and communication lines L3, L4 are connected to terminals T3, T4. The external power source 50 transmits a control pilot signal (CPLT signal) to the vehicle 1 through the communication lines L3, L4. The bidirectional communication between the vehicle 1 and the external power source 50, that is, in-band communication, is performed by superimposing a high frequency signal, which has a higher frequency than the CPLT signal, on the CPLT signal through the communication lines L3, L4.

The in-band communication is performed by a charging communication ECU 40. The charging communication ECU 40 includes a voltage monitoring circuit 42, an in-band communication circuit 44, and a controller 46. The voltage monitoring circuit 42 detects the potential difference of the communication line L3 relative to the communication line L4, which indicates the reference potential, that is, the voltage of the communication line L3. The in-band communication circuit 44 superimposes a high frequency signal on a CPLT signal that transfers through the communication line L3 to perform the in-band communication. When the voltage detected by the voltage monitoring circuit 42 is received, the controller 46 operates the in-band communication circuit 44 and performs LAN communication with the charging control ECU 32 through a communication line LAN.

When charging preparation is set based on the communication result transmitted from the charging communication ECU 40, the charging control ECU 32 executes the process for decreasing the voltage of the communication line L3 when the logic of the CPLT signal is "H." The charging control ECU 32 also opens and closes a power relay 34 that connects the accessory battery 26 and the charging communication ECU 40. In FIG. 1, the power supply indicated by a circle is connected to the accessory battery 26 by the power relay 34. The charging control ECU 32 is connected to the accessory battery 26 but not by the power relay 34. In FIG. 1, the power supply indicated by a square is connected to the accessory battery 26 but not by the power relay 34. In FIG. 1, the power supply indicated by an inverted triangle is connected to the accessory batter 26 by an electric line that differs from those of the power supplies indicated by a circle and a square.

The vehicle 1 includes a communication device 47 that is capable of performing wireless communication with an external device using a telephone line or the like. The communication device 47 may communicate with the charging control ECU 32 or the like using the communication line LAN.

The external power source 50 may communicate with a center 52. The center 52 obtains information of electricity price that varies in accordance with time or season. The center 52 may communicate with the communication device 47 and a portable device 60 carried by the user. The portable device 60 is a general multifunctional phone or the like. When the portable device 60 is a general multifunctional phone, a charging communication application program is installed on the portable device 60 so that the portable device 60 is used for the communication for charging the high voltage battery 16.

The process for charging the high voltage battery 16 from the external power source 50 will now be described with reference to FIG. 2.

Figure 2:
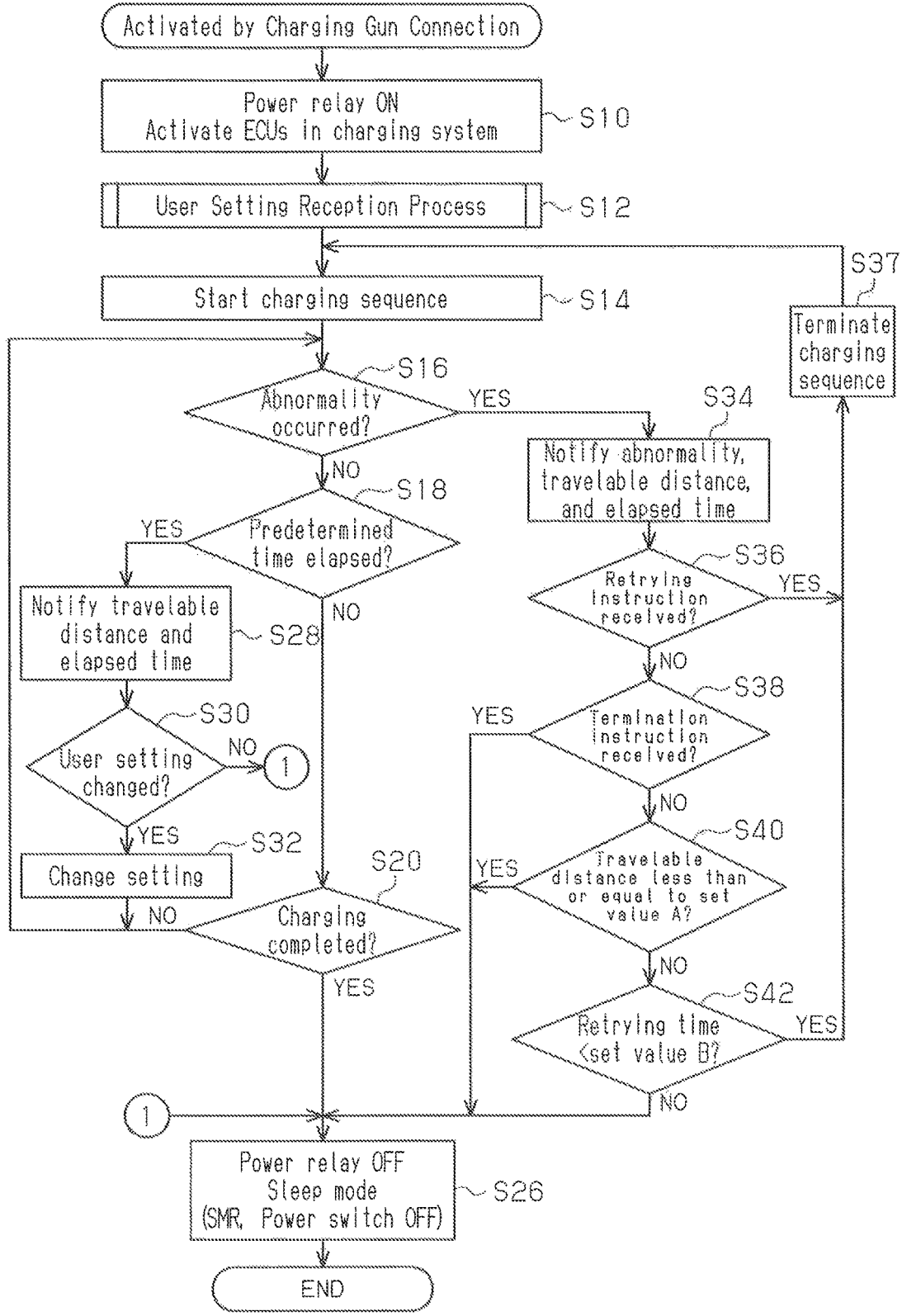
FIG. 2 is a flowchart showing the procedures of a charging process.
Figure 3:
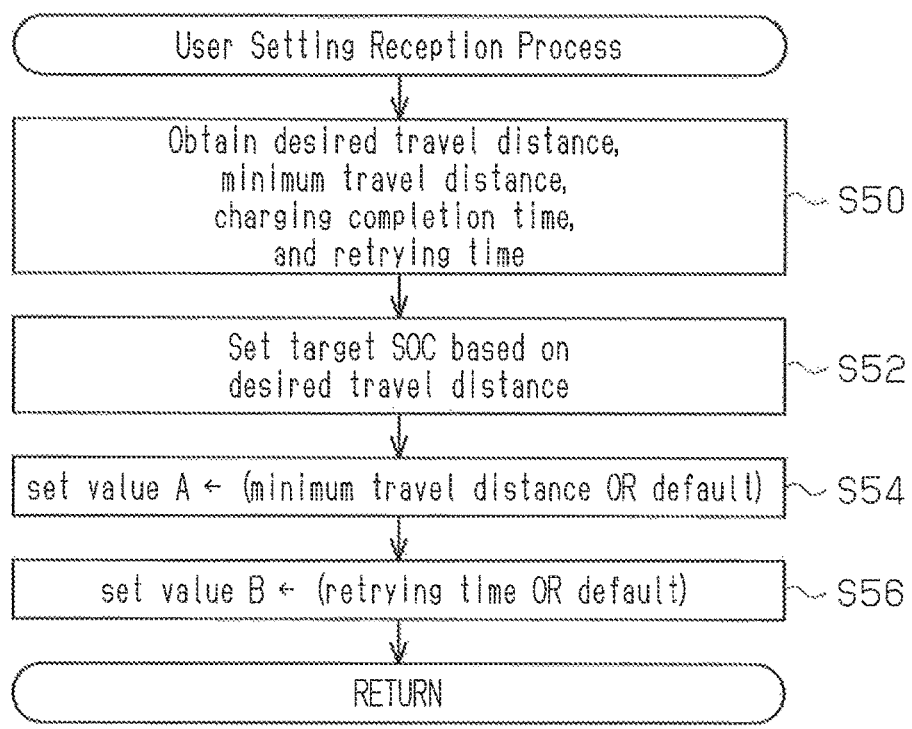
FIG. 3 is a flowchart showing the procedures of a user setting reception process.

The sequence of processes shown in FIG. 2 is triggered when the charging gun is connected to the terminals T1, T2 and executed by the charging control ECU 32. The processes of FIG. 2 are executed when the charging control ECU 32 detects that the charging lines L1, L2 are connected to the terminals T1, T2 and is switched to the wake-up mode from the sleep mode.

As shown in FIG. 2, the charging control ECU 32 first activates the power relay 34 and activates the power control computer 22 through the communication line LAN. When the user gets out the parked vehicle 1 and connects the charging gun, the power control computer 22 is normally in the sleep mode. The power control computer 22 is regularly switched to the wake-up mode to activate the power switch 18a and monitors the state of the high voltage battery 16. The execution of this process is not triggered when the charging gun is connected to the terminals T1, T2. Thus, the charging control ECU 32 switches the power control computer 22 to the wake-up mode using the LAN. When the power control computer 22 is switched to the wake-up mode by the charging control ECU 32, the process for charging the high voltage battery 16 is executed (S10). More specifically, the SMR 14 is closed, and the electric line is connected between the charger 30 and the high voltage battery 16. Additionally, when the power switch 18a is closed, the monitoring unit 18b is activated. The monitoring unit 18b executes the process for monitoring the state of each battery cell included in the high voltage battery 16. At this time, the power consumption amount of the charging control ECU 32 and the power control computer 22 increases, and the charging communication ECU 40 starts to consume power. This decreases the stored power amount of the accessory battery 26. Thus, the power control computer 22 drives the DC-DC converter 24 and executes the process for charging the accessory battery 26 with the storage charge of the high voltage battery 16.

Then, the charging control ECU 32 executes a user setting reception process that inquires desire of the user about the charging process (S12). As shown in FIG. 3, in the user setting reception process, the charging control ECU 32 obtains a desired travel distance, a minimum travel distance, charging completion time, and retrying time (S50). Such information is input by the user from the input portion 33. The desired travel distance refers to the travelable distance of the vehicle 1 that is desired by the user. The minimum travel distance refers to the lower limit value of the travel distance desired by the user. The charging completion time refers to the time when the user desires the charging to be completed. The retrying time refers to the retrying time desired by the user when an abnormality occurs in in-band communication.

When the information is obtained, the charging control ECU 32 sets a target value (target SOC) of the state of charge (SOC) of the high voltage battery 16 based on the desired travel distance (S52). This process is executed based on information related to a travel distance per unit charge amount and the full charge amount of the high voltage battery 16. More specifically, the target SOC is set based on the desired travel distance and the information related to the travel distance per unit charge amount by calculating a charge amount that allows for the traveling of the desired travel distance and subtracting the charge amount from the full charge amount.

When the minimum travel distance has been obtained in step S50, the charging control ECU 32 sets a set value A to the minimum travel distance. When the minimum travel distance has not been obtained in step S50, the charging control ECU 32 sets the set value A to a default value (S54). The default value is set, for example, to a distance in which the vehicle 1 can travel to the nearest dealer. When the retrying time has been obtained in step S50, the charging control ECU 32 sets a set value B to the retrying time. When the retrying time has not been obtained, the charging control ECU 32 sets the set value B to a default value (S56). The default value is set, for example, to time in which the SOC of the high voltage battery 16 does not excessively decrease.

When the process of step S56 is completed, the charging control ECU 32 completes the process of step S12 shown in FIG. 2.

When the process of step S12 is completed, the charging control ECU 32 starts the communication process for charging through in-band communication, that is, a charging sequence (S14). More specifically, when the communication lines L3, L4 are connected to the terminals T3, T4, the CPLT signal is transmitted from the external power source 50 to the communication line L3. The charging control ECU 32 outputs an instruction for starting in-band communication to the charging communication ECU 40 through the LAN. Consequently, the charging communication ECU 40 superimposes a high frequency signal that includes a request message on the CPLT signal. When the external power source 50 outputs a high frequency signal that includes a response message in response to the request message, the charging communication ECU 40 receives the high frequency signal. The received signal is demodulated and then transmitted from the charging communication ECU 40 to the charging control ECU 32.

The charging control ECU 32 determines whether or not an abnormality has occurred in the in-band communication (S16). The abnormality of the in-band communication includes a response signal unable to be received from the external power source 50 within a predetermined time in repose to a request signal transmitted from the charging communication ECU 40. Also, the abnormality of the in-band communication includes a received response signal not corresponding to the request signal. When an abnormality does not occur in the communication (S16: NO), the charging control ECU 32 determines whether or not a set time corresponding to the charging completion time has elapsed (S18). This process is executed using a timer that measures time elapsed in the process of step S14 by setting the set time to time from when the process of step S14 is started to when the charging is completed.

When the set time has not elapsed (S18: NO), the charging control ECU 32 determines whether or not the charging has been completed (S20). The charging completion refers to the SOC of the high voltage battery reaching the target SOC, which is set in the process of step S52 shown in FIG. 3. When the charging has been completed (S20: YES), the charging control ECU 32 deactivates the power relay 34 and switches to the sleep mode (S26). Prior to the switching to the sleep mode, the charging control ECU 32 instructs the power control computer 22 to switch to the sleep mode. Thus, the power control computer 22 deactivates the SMR 14 and the power switch 18a and then switches itself to the sleep mode. If the charger 30 is already operated and the process for charging the high voltage battery 16 from the external power source 50 is being executed when shifting to this process, the charging process is also terminated.

When the set time has elapsed (S18: YES), the charging control ECU 32 outputs the travelable distance based on the present SOC of the high voltage battery 16 and the time elapsed in the charging process to the external power source 50 to notify the user (S28). At this time, the communication device 47 transmits the travelable distance and the elapsed time to the center 52. The center 52 transmits the travelable distance and the elapsed time to the portable device 60. The charging control ECU 32 calculates the travelable distance based on the SOC of the high voltage battery 16, the full charge amount of the high voltage battery 16, and the travel distance per unit charge amount.

The charging control ECU 32 determines whether or not the user setting has been changed (S30). This process determines whether or not the portable device 60 notifies that the user has changed the request, which is input in the process of step S12, in response to the notification of the process of step S28. The notification from the portable device 60 is performed through the communication between the portable device 60 and the center 52. When the notification is received, the center 52 transmits the content of the notification to the communication device 47 through wireless communication. When there is no notification of the request being changed (S30: NO), the charging control ECU 32 proceeds to the process of step S26. More specifically, the user did not change the instruction by the charging completion time, which was desired by the user. Thus, the charging control ECU 32 terminates the charging process and executes the process for reducing the power consumption amount.

When receiving the notification of the request being changed (S30: YES), the charging control ECU 32 executes the process for changing the setting of the process of step S12 (S32) and returns to the process of step S16. More specifically, when change is made by the charging completion time, affirmative determination is not made in step S18 at the present time. Thus, the charging control ECU 32 returns to the process of step S16 and continues the charging process. Also, when the charging has not been completed (S20: NO), the charging control ECU 32 returns to step S16.

When an abnormality has occurred in the communication (YES in S16), the charging control ECU 32 notifies the user of the communication abnormality, the travelable distance based on the present SOC of the high voltage battery 16, and the time elapsed in the charging process (S34). In this process, the communication device 47 transmits the travelable distance and the elapsed time to the center 52, and the travelable distance and the elapsed time are transmitted to the portable device 60 from the center 52.

The charging control ECU 32 determines whether or not a retrying instruction has been received from the user (S36). This process determines whether or not the user notifies the retrying of the communication from the portable device 60 in response to the notification of the process of step S34. When the retrying instruction is received (S36: YES), the charging control ECU 32 terminates the charging sequence (S37) and returns to the process of step S14 to restart the in-band communication from the beginning. This process is executed in accordance with the standard, that is, when an abnormality occurs in in-band communication, the in-band communication is restarted from the beginning.

When the retrying instruction is not received (S36: NO), the charging control ECU 32 determines whether or not a termination instruction has been received (S38). This process determines whether or not the user notifies the termination instruction from the portable device 60 in response to the notification of the process of step S34. When the instruction for terminating the charging has been received (S38: YES), the charging control ECU 32 proceeds to step S26.

When the termination instruction has not been received (S38: NO), the charging control ECU 32 determines whether or not the travelable distance is less than or equal to the set value A (S40). This process determines whether or not the SOC of the high voltage battery 16 is excessively decreased when the abnormality remains and the in-band communication cannot be performed in spite of the communication retrying. When the communication does not recover and the state for the charging process is maintained while the high voltage battery 16 is not charged, the storage charge of the vehicle 1 is consumed in an unnecessary manner as follows. Since the power switch 18a is closed, the monitoring unit 18b continues the monitoring process. Thus, the monitoring unit 18b consumes the storage charge of the high voltage battery 16 in an unnecessary manner. Additionally, the power control computer 22 and the charging control ECU 32 are in the wake-up mode. This increases the power consumption amount of the accessory battery 26. Further, when the charging communication ECU 40 is activated, the storage charge of the accessory battery 26 is consumed. When the SOC of the accessory battery 26 is decreased, the power control computer 22 drives the DC-DC converter 24 and charges the accessory battery 26 with the storage charge of the high voltage battery 16. Thus, the power control computer 22, the charging control ECU 32, and the charging communication ECU 40 consume the storage charge of the high voltage battery 16.

When the travelable distance is less than or equal to the set value A (S40: YES), the charging control ECU 32 proceeds to step S26. More specifically, when the travelable distance is less than the minimum desired distance set by the user, the charging control ECU 32 terminates the charging process to avoid further decreases of the SOC of the high voltage battery 16, which will be caused by the continuation of the charging process.

When the travelable distance is greater than the set value A (S40: NO), the charging control ECU 32 determines whether or not the retrying time is less than the set value B (S42). This process determines whether or not the retrying should be performed. When the retrying time is less than the set value B (S42: YES), the charging control ECU 32 proceeds to step S37. When the retrying time is greater than or equal to the set value B (S42: NO), the charging control ECU 32 proceeds to step S26.

The first embodiment has the advantages described below.

(1) As shown in step S26 of FIG. 2, when an abnormality occurs in the in-band communication, the monitoring unit 18b and the charging communication ECU 40 are powered off, and the power control computer 22 and the charging control ECU 32 are switched to the sleep mode. This limits the unnecessary consumption of the storage charge of the high voltage battery 16 when the high voltage battery 16 cannot be charged.

(2) If the travelable distance based on the SOC of the high voltage battery 16 is greater than or equal to the set value A when an abnormality occurs in the communication (S40: YES), the monitoring unit 18b and the charging communication ECU 40 are powered off, and the power control computer 22 and the charging control ECU 32 are switched to the sleep mode. In this case, the charging of the high voltage battery 16 is not resumed. This limits the travelable distance based on the SOC being from being excessively shortened.

(3) The user may set the set value A. Thus, the lower limit value of the travelable distance may be set in accordance with the desire of the user.

(4) When the retrying time exceeds the set value B, the monitoring unit 18b and the charging communication ECU 40 are powered off, and the power control computer 22 and the charging control ECU 32 are switched to the sleep mode. When an upper limit is set in the retrying time as described above, the travelable distance based on the SOC of the high voltage battery 16 is limited from decreasing to be lower than the minimum travel distance desired by the user, which would occur when the retrying is repeated.

(5) The user may set the set value B. Thus, the upper limit value of the retrying time may be set in accordance with the desire of the user.

(6) The user is notified of the abnormality in the communication and the travelable distance based on the present SOC of the high voltage battery 16 (S34). This allows the user to know that the abnormality has occurred in the communication and the state related to the travelable distance.

(7) An abnormality may be coped with in accordance with the instruction output from the user in response to a notification of the abnormality (S36, S38). This allows the user to cope by changing the desire about the charging process when the user knows the abnormality.

(8) The condition for powering off the monitoring unit 18b and the charging communication ECU 40 and switching the power control computer 22 and the charging control ECU 32 to the sleep mode is an abnormality of in-band communication. In general, when an abnormality occurs in in-band communication, the communication needs to be restarted from the beginning. Thus, whether or not the charging process can be resumed after an abnormality occurs in the communication depends on whether or not the retrying process of the in-band communication succeeds. Thus, when the retrying process does not succeed, the storage charge of the high voltage battery 16 is consumed in an unnecessary manner. In this regard, user of the process for powering off the monitoring unit 18b and the charging communication ECU 40 and switching the power control computer 22 and the charging control ECU 32 to the sleep mode has a great advantage.

Second Embodiment

A second embodiment of the present invention will now be described with reference to FIG. 4. The description of the second embodiment will focus on the differences from the first embodiment.

Figure 4:
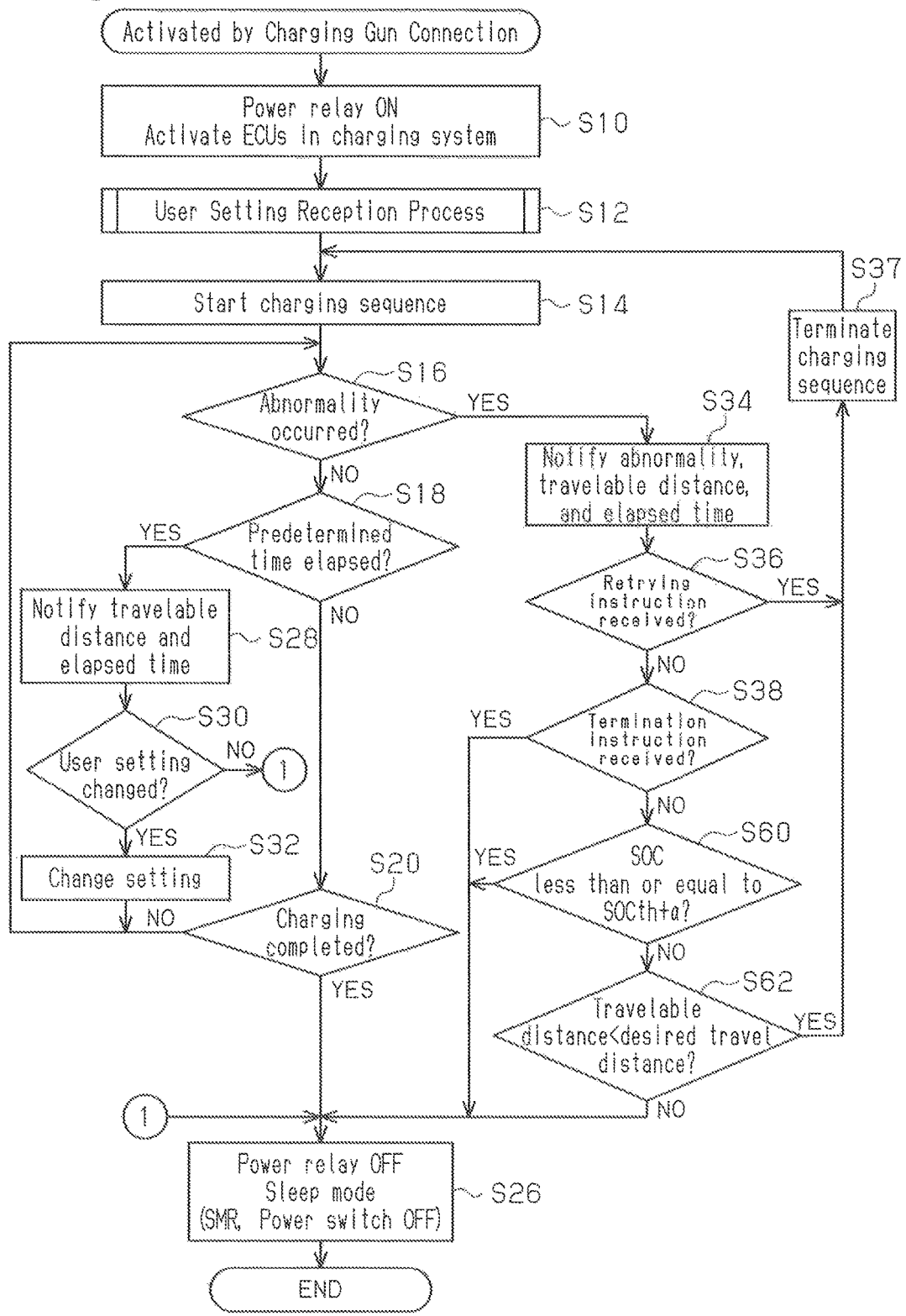
FIG. 4 is a flowchart showing the procedures of a second embodiment of a charging process according to the present invention.

The sequence of processes shown in FIG. 4 is triggered when the charging gun is connected to the terminals T1, T2 and executed by the charging control ECU 32. In FIG. 4, the same step numbers are given to those processes that are the same as the corresponding processes shown in FIG. 2.

In the processes shown in FIG. 4, when negative determination is made in the process of step S38, the charging control ECU 32 determines whether or not the SOC is less than or equal to a value obtained by adding a margin amount a to a lower limit value SOCth (S60). This process determines whether or not the SOC is decreased to a level that decreases the reliability of the high voltage battery 16 when the storage charge of the high voltage battery 16 is further consumed. The lower limit value SOCth refers to a lower limit value that maintains the reliability of the high voltage battery 16. The margin amount α is set so that the SOC of the high voltage battery 16 is not decreased to be lower than the lower limit value SOCth when negative determination is made in step S60 and the retrying process is continued.

When affirmative determination is made in step S60, the charging control ECU 32 discontinues the charging process and proceeds to the process of step S26 to reduce the power consumption amount of the vehicle 1. When negative determination is made in step S60, the charging control ECU 32 determines whether or not the travelable distance based on the SOC of the high voltage battery 16 is less than or equal to the desired travel distance (S62). This process determines whether or not the SOC of the high voltage battery 16 satisfies the request of the user. When determining that the travelable distance based on the SOC is less than the desired travel distance (S62: YES), the charging control ECU 32 proceeds to step S37. When determining that the travelable distance based on the SOC is greater than or equal to the desired travel distance (S62: NO), the charging control ECU 32 terminates the charging process and proceeds to step S26.

The second embodiment has the advantages described below in addition to advantages (1) and (6) to (8) of the first embodiment.

(9) The condition for retrying the communication after an abnormality occurs in the in-band communication is that the SOC of the high voltage battery 16 is greater than or equal to the value obtained by adding the margin amount α to the lower limit value SOCth. This limits the SOC of the high voltage battery 16 from being decreased to be lower than the lower limit value SOCth.

(10) The retrying process is executed in the condition in which the travelable distance based on the SOC of the high voltage battery 16 is less than the desired travel distance. This increases the probability of increasing the SOC when the SOC of the high voltage battery 16 does not conforms to the desire of the user.

Third Embodiment

A third embodiment of the present invention will now be described with reference to FIG. 5. The description of the third embodiment will focus on the differences from the first embodiment. In FIG. 5, the same reference characters are given to those components that are the same as the corresponding components shown in FIG. 1.

As shown in FIG. 5, the charging control ECU 32 is connected to the accessory battery 26 by a power relay 70. The power relay 70 is opened and closed by the power control computer 22 and the charging control ECU 32. The above configuration is obtained when the power relay 70 is of a normally open type. In this case, when the power control computer 22 closes the power relay 70, the charging control ECU 32 is switched from a power interruption state to a power supplying state. This enables the charging control ECU 32 to be energized to maintain the power relay 70 in the closed state. At this point of time, if the energization of the power control computer 22 is terminated, the energization of the charging control ECU 32 is terminated. This opens the power relay 70.

In the process of step S26 shown in FIGS. 2 and 4, the charging control ECU 32 switches itself to the sleep mode. Instead, in the third embodiment, the power supply is interrupted by opening the power relay 70. Consequently, the charging control ECU 32 is unable to monitor whether or not the charging lines L1, L2 are connected to the terminals T1, T2. However, the power consumption amount of the charging control ECU 32 may be further reduced.

When the user attempts to resume the charging process after the process of step S26, the power control computer 22 may close the power relay 70.

The correspondence relationship between the components of the means for solving the problem and the components of each of the above embodiments will now be described.

external power source device . . . 50; in-vehicle power storage device . . . 16, 26; communication unit . . . 40; transfer control unit . . . 32; reduction processing unit . . . S26; power consumption amount when executing control for transferring power . . . power consumption amount in wake-up mode; when power is being transferred . . . when a time of affirmative determination in S16 is after charging is started; parameter related to stored power amount . . . travelable distance, SOC; determination unit . . . processes of S40, S42, S56, S60, S62; obtaining unit . . . S50; notification processing unit . . . S34; reception unit . . . S36, S38; standard of in-band communication . . . process of S37; power transmission line is connected to power transfer port . . . charging gun is connected; mode in which power consumption amount is increased . . . wake-up mode of charging control ECU 32

The above embodiments may each be modified as follows.

As a specific example of the reduction processing unit, before the charging control ECU 32 is switched to the sleep mode, the power relay 34 is opened and the charging communication ECU 40 is deactivated. Instead, for example, the charging communication ECU 40 may be configured to be able to be constantly supplied with power from the accessory battery 26. Before the switching to the sleep mode, the charging communication ECU 40 may be notified that power can be constantly supplied from the accessory battery 26. This allows the charging communication ECU 40 to be switched to the sleep mode and reduces the power consumption amount of the charging communication ECU 40.

The power control computer 22 does not have to be switched to the sleep mode in accordance with the communication through LAN performed before the charging control ECU 32 is switched to the sleep mode. When the time for switching the power control computer 22 to the sleep mode is set separately from when the charging control ECU 32 is determined to switch to the sleep mode, the switching time may be greatly delayed from the time for switching the charging control ECU 32 to the sleep mode. In this case, the power consumption amount of the vehicle 1 may be also reduced by switching the charging control ECU 32 to the sleep mode.

For example, in the process of step S26, the SMR 14 and the power switch 18a are opened by the power control computer 22, and the power control computer 22 is switched to the sleep mode. However, the charging communication ECU 40 may continue to be in the wake-up mode when the power relay 34 remains closed. This also reduces the power consumption amount of the monitoring unit 18b and the power control computer 22. When the user outputs a new instruction related to the charging of the high voltage battery 16 through the center 52, the response to the instruction of the user may be promptly performed.

In the process of step S26, any of the process for powering off the charging communication ECU 40, the process for opening the SMR 14 and the power switch 18b using the power control computer 22, and the process for switching the power control computer 22 to the sleep mode does not have to be executed. In this case, the power consumption amount of the charging control ECU 32 may be reduced by switching the charging control ECU 32 to the sleep mode.

In the third embodiment (FIG. 5), the process for powering off the charging communication ECU 40, the process for opening the SMR 14 and the power switch 18a using the power control computer 22, and the process for switching the power control computer 22 to the sleep mode are executed together with the interruption of power supply to the charging control ECU 32. However, at least one of the above processes may be omitted.

Devices that are activated during the charging may include, for example, the MGECU 20 in addition to the illustrated embodiments. Consequently, even when the SMR 14 is closed and a smoothing capacitor connected to the input terminal of the inverter 12 is charged, the MGECU 20 may operate the inverter 12 to discharge the smoothing capacitor before the charging control ECU 32 is switched to the sleep mode. The smoothing capacitor may be discharged by applying reactive current to the motor generator 10 or applying short circuit current to upper and lower arms of the inverter 12.

In step S40 of FIG. 2, the parameter of the stored power amount may be obtained by comparing SOC that conforms to the desire of the user and the actual SOC instead of using the travelable distance. The SOC conforming to the desire of the user may be obtained from information of the SOC desired by the user instead of the process of step S40 shown in FIG. 3. Alternatively, the SOC conforming to the desire of the user may be obtained by converting the travelable distance input by the user. Instead of the SOC, the stored power amount may be used.

When a vehicle includes an in-vehicle power storage device capable of charging and discharging and a fuel battery, information related to a travel distance may be generated taking into consideration not only the amount of power stored in the power storage device but also the amount of power that the fuel battery is capable of generating. When a hybrid vehicle includes a device for storing electric energy and a fuel storage that stores fuel combusted in the internal combustion engine, a travelable distance including combustion energy of the fuel may be used as information related to a travel distance.

Instead of the retrying time, the number of times of retrying may be limited. Further, a predetermined value may be used as the retrying time or the number of times of retrying.

The period in which an abnormality occurs in communication is not limited to when an abnormality occurs in communication that is started by connecting the charging gun and the communication lines L3, L4. For example, when charging is not immediately started and started after a predetermined time elapses based on the electricity price obtained through in-band communication, an abnormality may occur in the in-band communication performed when starting the charging. In this case, after a charging plan is made and the power relay 34 is opened, the charging control ECU 32 is switched to the sleep mode. The charging control ECU 32 is activated when the predetermined time elapses. Then, the charging control ECU 32 closes the power relay 34 and instructs the charging communication ECU 40 to perform in-band communication. When an abnormality occurs in the in-band communication, the probability of the user being near the vehicle 1 is lower than immediately after the charging gun is connected. Thus, notification to the portable device 60 is particularly advantageous.

The system for transferring power is not limited to a system that charges the high voltage battery 16 of the vehicle with power from an external device and may be a system that supplies power from the high voltage battery 16 to an external device. This case also needs to cope with an abnormality that occurs when performing communication with an external power source during the power supply. If a device for supplying power to an external device and the controller for the device continue to be in a non-sleep mode even though an abnormality occurs in the communication, the storage charges of the high voltage battery 16 and the accessory batter 26 are consumed in an unnecessary manner. Thus, the reduction processing unit is advantageous.

The user is notified of an abnormality by the portable device 60. Instead, the user may be notified by visual information or audial information. A device that notifies the user of an abnormality may be an energy control device having the above function and located inside a house.

In the second embodiment (FIG. 5), the power supply of the charging control ECU 32 is switched from an interruption state to a supply state by the power control computer 22. Instead, the charging control ECU 32 may be powered on, for example, when the user operates an operation member.

The function that monitors the high voltage battery 16 and the function that outputs an instruction to the MGECU 20 may be included in different hardware devices instead of being included in the single power control computer 22.

The illustrated electric vehicle includes only an in-vehicle power storage device as a device that stores energy generating driving force of the vehicle 1. Instead, a hybrid vehicle including an in-vehicle power storage device and an internal combustion engine may be used. The illustrated vehicle includes one rotary apparatus, which is mechanically coupled to the driving wheel. Instead, a series-parallel hybrid vehicle including two rotary apparatuses may be used.

A charging device that charges the high voltage battery 16 from the external power source 50 may include, for example, a portion of the inverter 12, which serves as components of the charging device, other than the dedicated charger 30. In this case, the charging control ECU 32 and the MGECU 20 may be integrated.

The charger 30 may be connected between the SMR 14 and the high voltage battery 16 by a relay that opens and closes the electric line or the like. This avoids connection between the inverter 12 and the high voltage battery 16 when charging the high voltage battery 16 from the external power source 50.

A boost converter may be arranged between the high voltage battery 16 and the inverter 12.

The invention claimed is:

1. A power transfer control device applied to a vehicle including an in-vehicle power storage device that transfers power to and from an external power source and a communication unit that performs communication to transfer the power, the power transfer control device comprising:
  a transfer control unit that executes control for transferring the power;
  a reduction processing unit that reduces a power consumption amount of the transfer control unit to be lower than a power consumption amount of when the transfer control unit executes control for transferring the power under a condition in which an abnormality occurs in the communication;
  a determination unit that determines, after an abnormality occurs in the communication, whether or not to execute a process for reducing the power consumption amount with the reduction processing unit when receiving a value of a parameter related to a stored power amount of the in-vehicle power storage device; and
  an obtaining unit that obtains information related to a minimum travel distance that is desired by a user, wherein when the communication is communication performed when the in-vehicle power storage device is charged from the external power source, the reduction processing unit executes the process for reducing the power consumption amount, and under a condition in which the stored power amount is less than or equal to an amount corresponding to the minimum travel distance, the determination unit determines to execute the process for reducing the power consumption amount with the reduction processing unit.

2. The power transfer control device according to claim 1, wherein the determination unit determines, after an abnormality occurs in the communication, to execute the process for reducing the power consumption amount with the reduction processing unit under a condition in which a period during which a communication process is retried is greater than or equal to a predetermined value.

3. The power transfer control device according to claim 2, further comprising:

an obtaining unit that obtains information related to a retrying period that is desired by a user, wherein the determination unit sets the predetermined value to the retrying period, which is obtained by the obtaining unit.

4. The power transfer control device according to claim 1, further comprising a notification processing unit that notifies a user of an abnormality of the communication and information related to a stored power amount of the in-vehicle power storage device when an abnormality occurs in the communication.

5. The power transfer control device according to claim 4, further comprising:

a reception unit that receives an instruction of the user in response to notification of the notification processing unit, wherein the determination unit determines whether or not to execute a reduction process with the reduction processing unit in accordance with reception of the reception unit.

6. The power transfer control device according to claim 1, wherein communication with the external power source is bidirectional communication, and when an abnormality occurs in the communication, the communication is interrupted by at least one of a side of the external power source and a side of the communication unit.

7. The power transfer control device according to claim 1, wherein the transfer control unit executes a process for monitoring whether or not a power transmission line has been connected to a power transfer port, which is a vehicle-side interface that transfers power to and from the external power source, a power consumption amount in a mode in which the monitoring process is executed is less than a power consumption amount in a mode in which control for transferring the power is executed, when connection of the power transmission line is detected, the transfer control unit is switched to the mode in which control for transferring the power is executed, and a reducing process executed by the reduction processing unit includes a process for switching to the mode in which the process for monitoring is executed.

8. The power transfer control device according to claim 1, wherein the reduction processing unit interrupts power supply of the transfer control unit to reduce the power consumption amount of the transfer control unit to lower than the power consumption amount when the transfer control unit executes control for transferring the power.

9. The power transfer control device according to claim 1, wherein the reduction processing unit reduces a power consumption amount of the communication unit in addition to the power consumption amount of the transfer control unit.

10. A power transfer control device applied to a vehicle including an in-vehicle power storage device that transfers power to and from an external power source and a communication unit that performs communication to transfer the power, the power transfer control device comprising:

a transfer control unit that executes control for transferring the power;

a reduction processing unit that reduces a power consumption amount of the transfer control unit to be lower than a power consumption amount of when the transfer control unit executes control for transferring the power under a condition in which an abnormality occurs in the communication;

a determination unit that determines, after an abnormality occurs in the communication, whether or not to execute a process for reducing the power consumption amount with the reduction processing unit when receiving a value of a parameter related to a stored power amount of the in-vehicle power storage device; and wherein when the communication is communication performed when the in-vehicle power storage device is charged from the external power source, the reduction processing unit executes the process for reducing the power consumption amount, and under a condition in which the stored power amount is greater than a specified amount that is specified based on a lower limit stored power amount of the in-vehicle power storage device, the determination unit determines to retry a communication process for charging the in-vehicle power storage device from the external power source without executing the process for reducing a power consumption amount with the reduction processing unit.

11. The power transfer control device according to claim 10, further comprising:

an obtaining unit that obtains information related to a travel distance that is desired by a user, wherein when the communication is communication performed when the in-vehicle power storage device is charged from the external power source, the reduction processing unit executes the process for reducing the power consumption amount, and under a condition in which the stored power amount is less than a stored power amount corresponding to the travel distance that is desired by the user, the determination unit determines to retry a communication process for charging the in-vehicle power storage device from the external power source without executing the process for reducing the power consumption amount with the reduction processing unit.

* * * * *